Aug. 20, 1957 D. W. NORWOOD 2,803,162
AUTOMATIC EXPOSURE METER
Filed Oct. 18, 1954 3 Sheets-Sheet 1
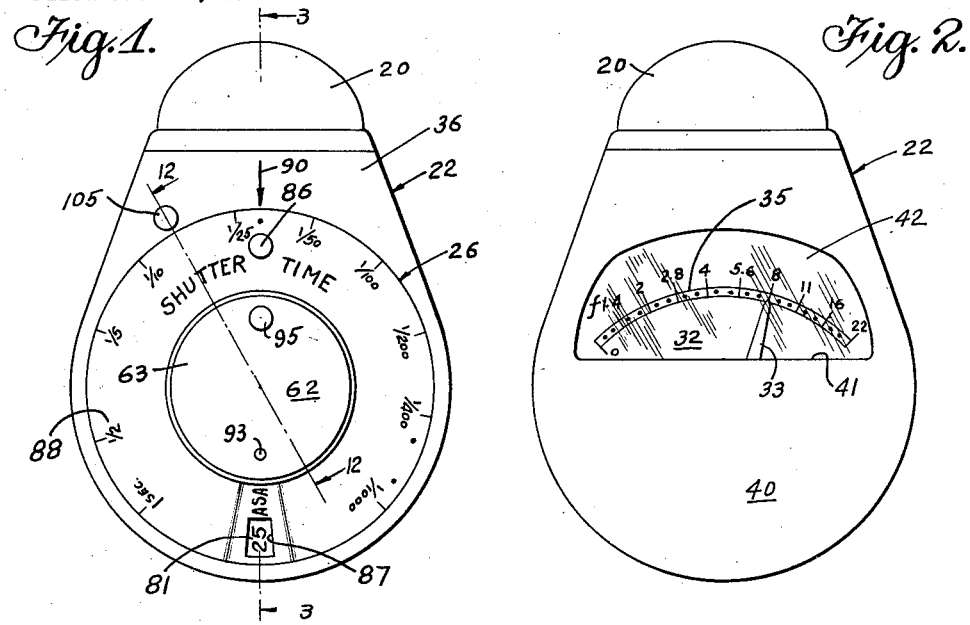
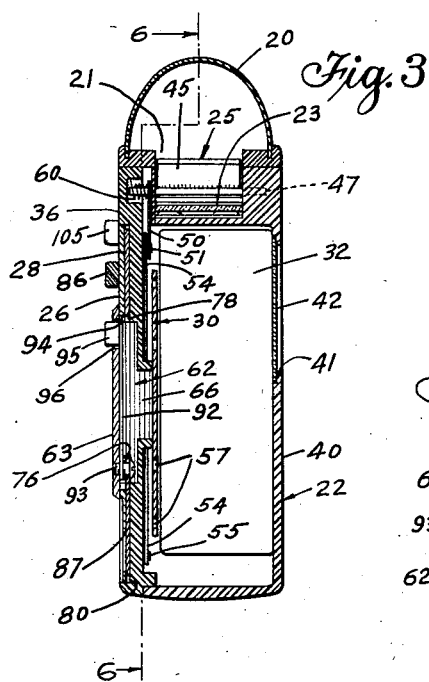
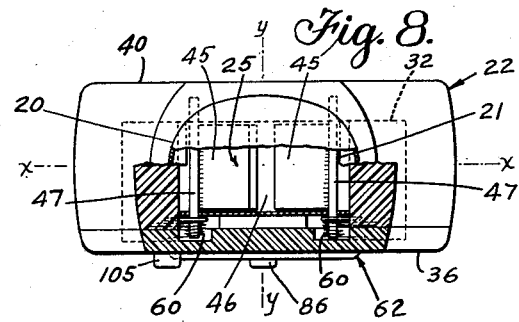
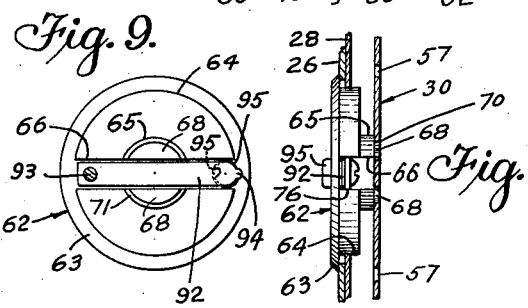
INVENTOR.
Donald W. Norwood
BY
ATTORNEYS Aug. 20, 1957 D. W. NORWOOD 2,803,162
AUTOMATIC EXPOSURE METER
Filed Oct. 18, 1954 3 Sheets-Sheet 2

INVENTOR.
Donald W. Norwood
BY Knight + Rodgers
ATTORNEYS

Aug. 20, 1957 D. W. NORWOOD 2,803,162
AUTOMATIC EXPOSURE METER
Filed Oct. 18, 1954 3 Sheets-Sheet 3
Fig. 13.
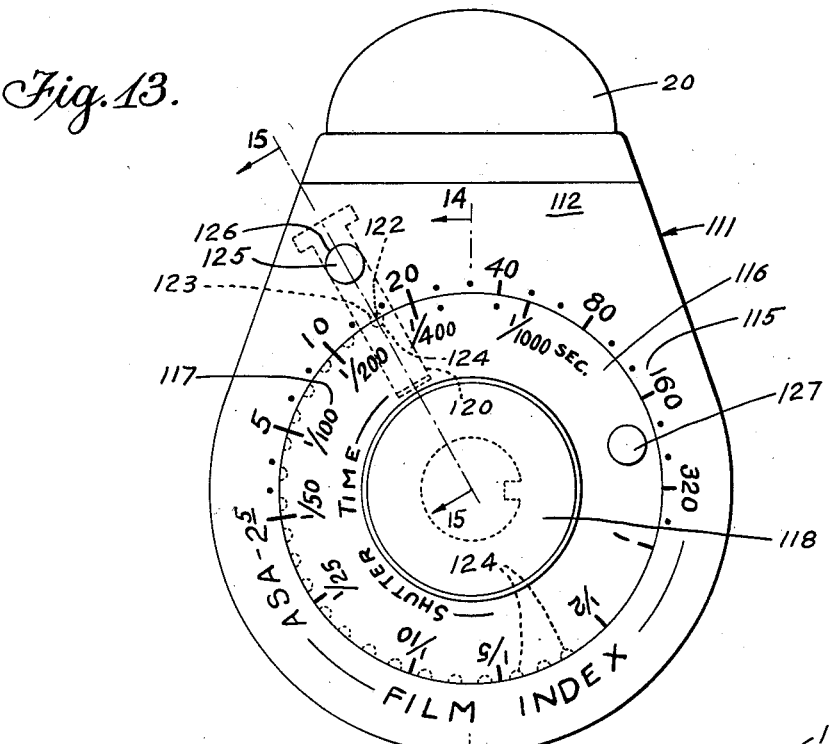
Fig. 14.
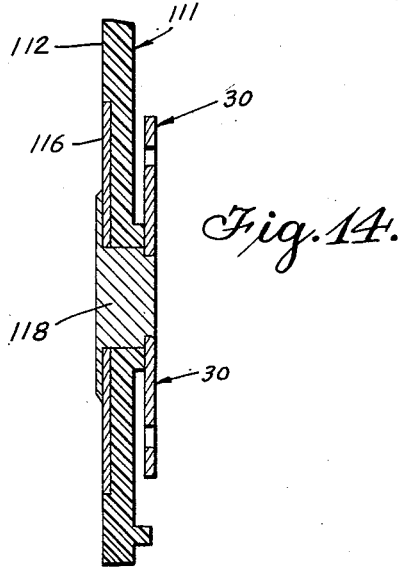
Fig. 15.
INVENTOR.
Donald W. Norwood
BY
Knight & Rodgers
ATTORNEYS

United States Patent Office 2,803,162
Patented Aug. 20, 1957

2,803,162

AUTOMATIC EXPOSURE METER

Donald W. Norwood, Pasadena, Calif., assignor to Donald H. Norwood, trustee, Pasadena, Calif.

Application October 18, 1954, Serial No. 462,973

8 Claims. (Cl. 88—23)

This invention relates to an automatic exposure meter for use in indicating the correct setting for the adjustable exposure controls on a camera so that optimum exposure of the film will result. This exposure meter operates on the principle of measurement of incident illumination. This feature provides for accuracy of photographic results, and other advantages.

One of the particular objects of the invention is to provide an exposure meter with maximum simplicity of operation, combined with accuracy of results, and usefulness over a broad range of each of the factors involved in exposure control.

A further object of the invention is to provide an automatic exposure meter for taking all pertinent factors into account without the use of a calculator, thus greatly simplifying determination of the correct camera settings.

Another object of the invention is to provide means on the device to assist the operator in easily following through the unusually simple routine of operation.

One important object of the invention is to provide an accurate exposure meter that will give direct readings of the camera aperture settings required for correct exposure of films of given sensitivities at given time settings of a camera shutter.

In problems of photographic exposure control there are usually four factors involved, namely, film sensitivity, camera shutter time, effective illumination intensity, and camera lens aperture.

The relationship of the foregoing listed factors may be expressed by the following mathematical formula:

$$\frac{f^2}{t} = \frac{SE}{K} \quad (1)$$

where $f$=camera lens aperture in $f$-stop values.
$t$=camera shutter time in seconds.
$S$=film sensitivity in ASA film index numbers.
$E$=effective incident illumination in foot-candles.
$K$=a constant.

A value of about 30 may be used for K with excellent results. The exposure determined through use of this formula gives superior photographic quality. This is particularly evident in the case of color films, which in general have more exacting exposure requirements than black-and-white films.

The factors in the foregoing Equation 1 may be rearranged by transposition in the following manner:

$$f^2 = E \cdot St \cdot \frac{1}{K} \quad (2)$$

The factors shown in Equation 2 fall into groups which lend themselves to effective handling by an appropriate design for an automatic exposure meter. In the exposure meter of the present invention means are provided for taking into account each of these groups.

The factor group $$\frac{1}{K}$$

is constant, and is taken into account through permanent design and calibration of the meter.

The factor group $St$ is taken into account by means of an adjustable light valve, incorporated in the device, which acts under the control of scale means which are preset in accordance with the compound effect of the factors S and $t$, to modify the sensitivity of the meter as described hereinafter. A novel system of controls, exponential type scales, indices and linkage is provided which enables adjustment of the light valve so that each of the two foregoing listed factors in the factor group $St$ will be given proper weight in the indication of the correct answer for a given problem. In effect the meter is preset to have a sensitivity which corresponds to the camera sensitivity established by the factors S and $t$.

With all permanent and preset factors on the right of the equality sign thus taken into account, the factor group $f^2$ will vary with and be proportional to the illumination factor group E.

A means for correctly measuring the factor group E representing effective illumination has been provided on the meter in the form of a translucent and diffusing light collector, in the shape of a hollow dome which is placed in front of a photoelectric cell. The photoelectric cell is electrically connected to a sensitive electrical indicator. This is in accord with the principles disclosed in my United States Patent 2,214,283.

The electrical indicator has a scale configuration and a pointer movement designed to translate values of $f^2$ directly into $f$ numbers, which is the most suitable form for exposure control. The above mentioned adjustable light valve is interposed between the translucent dome-shaped light collector and the photoelectric cell.

It will be seen that the functioning of this exposure meter takes place in accord with the principles expressed in the basic Equations 1 and 2.

A further object of the invention is to provide a pocket size exposure meter having a photoelectric cell to respond to the illumination of the subject, an indicator element responsive to the cell and movable along a scale representing the shutter aperture adjustments of a camera, means such as a light valve to vary the light reaching the photoelectric cell and means for adjusting the light valve in accord with the two exposure factors: film sensitivity and camera shutter time. When such an exposure meter is adjusted in accord with the type of film that is used and with a selected time setting of the camera shutter, the exposure meter may be used to measure the incident light that illuminates the subject and when so used will give a direct reading of the correct camera aperture setting.

In one form of the invention, the scale means which is preset to adjust the light valve in accord with the compound effect of the factors S and $t$ comprises two rotary members having two corresponding scales representing, respectively, the film sensitivity factor S and the shutter time factor $t$. One of these scale members is adjusted relative to a fixed index in accord with one of these factors and the second scale member, which is operatively connected to the light valve, is adjusted relative to the first scale member in accord with the other of the two factors.

In a second form of the invention, a fixed scale member, which may comprise a portion of the exposure meter housing, is provided with a scale representing one of the two factors S and $t$, and a single rotary scale member provided with a scale representing the other factor is operatively connected to the light valve, and is adjusted relative to the fixed scale member in accord with the values of both factors.

A further object of the invention is to meet a certain problem that arises in that the usual light valve variably restricts the area of the photoelectric cell that is exposed to light. The sensitivity or responsiveness of a photoelectric cell of the usual voltaic type is not uniform over its area. If the light is restricted to a selected minor portion of a photo-sensitive means that is not uniform in its sensitivity, the selected minor portion may be either under-sensitive or over-sensitive to cause corresponding error. The invention meets this problem by using a dome-shaped translucent and diffusing light collector in combination with a light valve having a variable slot, the general location of the variable slot being in the region of the radial center of the dome configuration and at sufficient distance from the photo-sensitive element to permit the light that passes through the slot to diverge over substantially the whole area of the photo-sensitive means. Thus when the slot is narrowed down to reduce the amount of light admitted to the cell, the slot being in the region of the radial center and at adequate distance from the cell, the light enters the slot over a wide range of angles and correspondingly diverges from the slot over a wide range of angles. Thus the admitted light is distributed over substantially the whole area of the cell to minimize the effect of variations in sensitivity of various portions of the cell.

The preferred practice of the invention provides an exposure meter that is relatively thin in one cross sectional dimension to achieve what may be termed a pocket-fitting configuration. A feature of the invention in this respect is the use of a dome-shaped translucent and diffusing light collector that is of generally semiellipsoidal configuration having three mutually perpendicular axes, namely, a major base axis, a minor base axis and a depth axis. The major base axis of the light collector dome extends in the same direction as the wider cross sectional dimension of the housing so that the light collector dome conforms with the desired relatively thin pocket-fitting configuration. A further feature of the invention in this regard is the concept of positioning the variable light-admitting slot of the light valve along the minor base axis of the light collector dome to provide maximum accuracy of adjustment and to favor the admission of light to the slot throughout an extensive range of angles.

A further object of the invention is to achieve compactness and the desired configuration in an exposure meter that has a combination of elements including a light collector dome, a photo-sensitive current-generating cell, a light valve between the dome and cell, a microammeter responsive to the current generated by the cell, and means to adjust the light valve in accord with the factors of film sensitivity and shutter time adjustment. In this regard the preferred practice of the invention is characterized by the concept of arranging these elements around the microammeter in a manner that achieves both the desired compactness and the desired configuration.

The microammeter has a relatively thin elongated configuration and occupies the major portion of the interior of the exposure meter housing, with its major dimensions extending parallel to the side faces of the housing and its smallest dimension extending perpendicular to said side faces. One side of the microammeter provides a movable indicating element or pointer which together with a cooperating scale is on one of the two side faces of the housing to indicate the aperture adjustment of the camera required for correct exposure of the film. The other side face of the housing is provided with scale means including at least one rotary scale member for adjustment in accord with the factors of film sensitivity and shutter time setting. The semiellipsoidal light collector dome and the associated photoelectric cell and light valve are located at one end of the microammeter with the dome extending outward at one end of the housing. Thus one end of the housing is adapted to receive the illumination that is to be measured, one of the side faces of the housing is provided with scale means for adjustment in accord with given exposure factors and the other side face of the housing is adapted to give the solution to the exposure problem as a specific aperture setting of the camera.

In the preferred practice of the invention a relatively thin rotary cam member is positioned in the housing adjacent the microammeter between the microammeter and the rotary scale member. This cam member is united with the rotary scale member for rotation therewith and is operatively connected with the light valve to adjust the light valve in accord with rotation of the rotary scale member.

The above and other objects and features of the invention will be apparent in the following detailed description considered with the accompanying drawings.

In the drawings, which are to be regarded as merely illustrative:

Fig. 1 is a face view of a selected embodiment of an exposure meter in accordance with the invention, showing the scale means on one face of the housing that may be adjusted in accord with the sensitivity of the film and the shutter time adjustment of the camera;

Fig. 2 is a similar view of the opposite face of the exposure meter showing the camera aperture scale and the associated light-responsive pointer;

Fig. 3 is a longitudinal section taken as indicated by the line 3—3 of Fig. 1;

Fig. 8 is a view of the exposure meter partly in end elevation and partly in transverse section taken as indicated by the line 8—8 of Fig. 6;

Fig. 9 is a rear elevation of a hub member with an associated latch for releasaby interconnecting the two scale members;

Fig. 10 is a fragmentary longitudinal section of the housing showing the hub member and the associated latch in side elevation;

Fig. 11 is a perspective view of the latch associated with the hub member;

Fig. 13 is a view similar to Fig. 1 showing a second form of the invention;

Fig. 14 is a fragmentary longitudinal section taken as indicated by the line 14—14 of Fig. 13; and Fig. 15 is a fragmentary radial section taken as indicated by the line 15—15 of Fig. 13.

Figure 4:
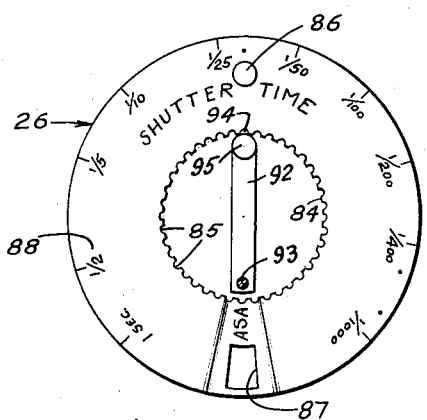
Fig. 4 is a front elevation of one of the two rotary scale members together with latch means that may be used for releasable interconnection of two rotary scale members.
Figure 5:
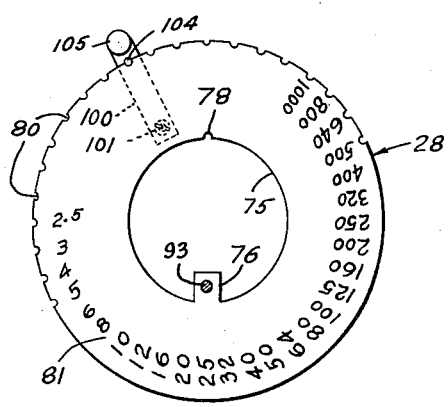
Fig. 5 is a similar view of the other rotary scale member together with a second latch means may be used for releasably immobilizing one of the two rotary scale members.

Generally described, the principal parts of the first embodiment of the invention include: a light collector in the form of a translucent and diffusing dome 20 spanning a window 21 at one end of an exposure meter housing 22; a light-sensitive element or photoelectric cell 23 of the voltaic type that generates electric current in accord with the amount of light received; a light valve that is generally designated by numeral 25 (Figs. 3, 6 and 8) and controls the amount of illumination reaching the photoelectric cell; a first or outer rotary scale member in the form of a disc 26 best shown in Fig. 4; a second or inner rotary scale member in the form of a disc 28 best shown in Fig. 5; a rotary cam member in the form of a disc 30 (Fig. 7) that is united with the inner rotary scale member 28 for rotation therewith to actuate the light valve 25; and indicating means in the form of a microammeter 32 that responds to the current generated by the photoelectric cell and which has an indicating element in the form of a pointer 33 for movement along a scale 35 of camera aperture settings, preferably in terms of *f*-stop values, as shown in Fig. 2.

The face or side wall 36 of the housing 22 constitutes a fixed scale member for cooperation with the two rotary scale members 26 and 28. These three scale members are provided with three scale means including two scales and an index to permit the outer rotary scale member 26 to be set relative to the housing 22 and to permit one of the rotary scale members to be set relative to the other rotary scale member. This positioning of the scale members relative to each other results in such adjustment of the light valve 25 as to preset the meter to have a sensitivity corresponding to that of the camera as established by the compound effect of film sensitivity and shutter times.

The housing 22, which is preferably made of a suitable plastic, is relatively broad along one cross dimension *x—x* as viewed endwise in Fig. 8 and is relatively thin along a second cross dimension *y—y* perpendicular thereto, these dimensions together with the length dimension of the housing being such as to give the housing what may be termed a pocket-fitting configuration. Lines *x—x* and *y—y* may be regarded respectively as the transverse major and minor dimensions or axes of the housing. Preferably the lower portion of the housing 22 is semi-circular in outline to conform to the circular configuration of the two rotary scale members 26 and 28 and the upper portion of the housing narrows to the base of the light-collector dome 20. Thus the major transverse dimension *x—x* varies throughout the length of the housing.

The manner in which a translucent and diffusing dome-shaped light-collector cooperates with a voltaic photoelectric cell for the measurement of effective incident illumination is fully disclosed in my United States Patent 2,214,283 issued September 10, 1940, which patent is hereby incorporated into the present disclosure by reference. In general, the function of the translucent dome is to receive the incident illumination and to act in turn as a source of diffused transmission of light to the photoelectric cell.

A feature of the present embodiment of the invention is that the light-collector dome 20 conforms to the relatively thin pocket-fitting configuration of the housing 22. For this purpose the dome 20 is perferably semi-ellipsoidal in general configuration with three mutually perpendicular axes. The dome has a major base axis coinciding with the line *x—x* of Fig. 8, a minor base axis conforming to the line *y—y* and a central upright depth axis which coincides with the line 3—3 of Fig. 1.

The photoelectric cell 23 is of a well known voltaic type and need not be described in detail. It is supported on the housing within the lower portion of the window 21, in position to receive light from the dome 20.

The microammeter 32 is connected electrically to the output terminals of the photoelectric cell so as to cause the pointer 33 to move in response to the current generated by the cell. It is positioned against the side wall 40 that forms one of the two side faces of the housing and this side wall has an opening 41 spanned by a transparent plate 42. The scale 35 of camera aperture settings and the associated pointer 33 may be viewed through this transparent plate as shown in Fig. 2.

The light valve 25 is interposed between the light-collector dome 20 and the photoelectric cell 23. It may take various forms in various practices of the invention but preferably is of a type that provides a light-admitting slot of variable width that extends along one of the base axes of the light-collector dome 20. In this particular embodiment of the invention the light valve comprises a pair of hinged leaves 45 that form a variable slot 46 extending along the minor base axis *y—y* of the light collector dome. The two leaves 45 are fixedly mounted on corresponding transverse pivot pins 47 and are actuated by the rotary cam 30 through the medium of a suitable linkage. The pivot pins 47 are rotatably mounted on the housing structure to provide for pivotal movement of leaves 45 about hinge axes extending parallel to said minor base axis, adjacent the photoelectric cell 23 and at opposite ends of the window 21.

Figure 6:
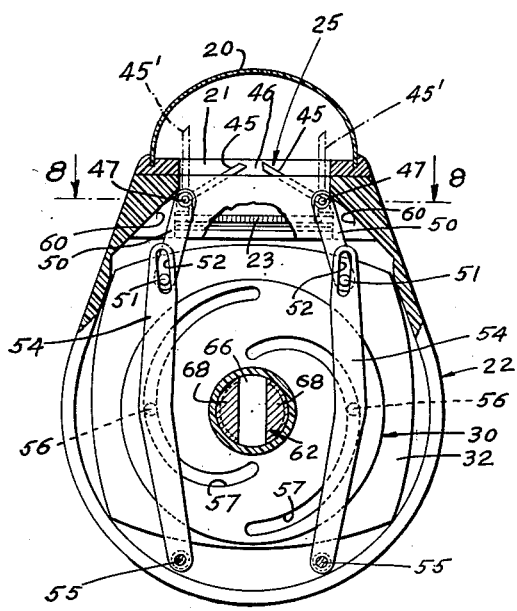
Fig. 6 is a longitudinal section taken as indicated by the broken line 6—6 of Fig. 3 showing how the rotary cam member is operatively connected to the light valve.
Figure 7:
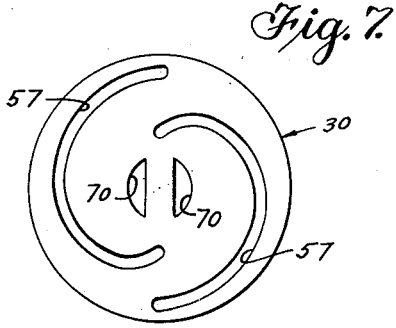
Fig. 7 is a front elevation of the rotary cam member.

As shown in Figs. 3 and 6, each of the two pivot pins 47 carries a crank 50 fixedly connected thereto and each of the cranks carries a stud or pin 51 at its outer end. Each of the pins 51 slidingly engages a corresponding slot 52 at the upper end of a corresponding rocker arm 54. The two rocker arms 54 are mounted at their lower ends on the face wall 36 of the housing by suitable pivots 55 and carry corresponding followers 56 in the form of pins that extend into corresponding eccentric cam slots 57 in the rotary cam member 30. The two cam slots 57 are of spiral configuration and are so dimensioned and positioned on the cam member 30 as to maintain the two followers 56 at appropriate distances from the axis of rotation of the cam member and effect equal movement of the two rocker arms 54. Thus rotation of the cam member 30 causes synchronous operation of the two light valve leaves 45 between fully open positions as indicated in dot-dash lines at 45' in Fig. 6, and substantially fully closed positions in which they substantially completely obstruct admission of light to the photoelectric cell 23. When the leaves 45 are in the fully open position, they extend up into the interior of the hollow light collector dome, a feature which contributes to compactness while permitting use of light valve leaves of sufficient length to accurately control the admission of light. Preferably suitable spring means is incorporated into this linkage to eliminate backlash in the actuation of the light valve. For this purpose coil springs 60 may be used at the ends of the two pivot pins 47 to bias the two leaves 45 towards their open positions.

Figure 12:
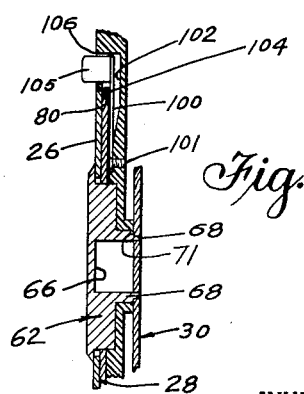
Fig. 12 is a fragmentary longitudinal section on line 12—12 in Fig. 1, showing the latch that immobilizes one of the rotary scale members.

The cam member 30 is fixedly mounted on the inner end of a hub member that is generally designated by numeral 62 and is best shown in Figs. 9 and 10. The hub member 62 has an outer circular wall or disc portion 63, an intermediate cylindrical body portion 64 and an inner cylindrical extension 65 of reduced diameter. The cylindrical body portion 64 and the inner cylindrical extension 65 of the hub member 62 are cut away to provide a diametrical slot 66. This diametrical slot divides the inner cylindrical extension 65 into two tongues 68 that extend into corresponding apertures 70 (Fig. 7) of the cam member 30 for uniting the cam member with the hub member. As shown in Fig. 12, the two tongues 68 are peripherally recessed along their rims to form peripheral shoulders 71 against which the cam member is backed, the material of the tongues being peened for secure anchorage of the cam member.

As shown in Fig. 5 the inner scale member or disc 28 is formed with a concentric aperture 75 to fit over the cylindrical body portion 64 of the hub member 62 and is further formed with a radially inward tongue 76 that extends into the diametrical slot 66 to interlock this scale member with the hub member 62. The concentric aperture 75 has a small latching recess 78 and the periphery of the scale member has a plurality of spaced latching recesses 80. Printed on the outer face of the inner scale member 28 is a scale 81 representing the sensitivity of various films in terms of ASA film index numbers.

The second outer scale member or disc 26 has a concentric aperture 84 which, as shown in Fig. 4, is formed with a series of marginal latching recesses 85. The scale member 26 is provided with a finger piece or button 86 and is formed with a window 87 through which the numerals of scale 81 may be seen, one at a time. The scale member 26 has printed thereon a scale 88 of shutter time settings for cooperation with an index mark 90 on the fixed scale member provided by the face wall 36 (Fig. 1) of the housing. The concentric aperture 84 fits rotatably over the cylindrical body portion 64 of hub member 62, and scale member 26 is retained thereon by the outwardly projecting marginal portion of the outer wall 63 of the hub member.

Preferably means is provided to releasably interconnect the two rotary scale members 26 and 28 for rotation in unison and it is for this purpose that the series of latching recesses 85 are provided in the outer scale member 26. The latch means for cooperation with the latching recesses 78 and 85 may comprise a leaf spring 92 that is mounted in the diametrical slot 66 of the hub member 62 and is anchored at one end by a suitable screw 93 (Fig. 3). The screw 93 not only extends through the end of the leaf spring 92 but also extends through the tongue 76 of the inner rotary scale member 28 to anchor the inner scale member 28 to the outer wall 63 of hub member 62. The other end of the leaf spring 92 forms latching lug 94 that normally extends into one of the series of latch recesses 85 to interlock the two rotary scale members 26 and 28, the normal position of the leaf spring 92 being flat against the bottom of the diametrical recess as shown in Fig. 3. The free end of the leaf spring 92 is also provided with an operating button 95 that extends outward through a corresponding aperture 96 in the hub member 62. When the button 95 is depressed the latching lug 94 is pressed inward into the clearance provided by recess 78 and out of engagement with the outer scale member 26 to permit rotation of the two scale members independently of each other.

Preferably a second latch means is provided for releasably immobilizing one of the two scale members 26 and 28 thereby to cooperate with the latching lug 94 to immobilize both of the scale members at set positions relative to each other and relative to the index mark 90. In this instance the second latching means immobilizes the inner rotary scale member 28 relative to the housing 22 and it is for this purpose that the inner scale member is provided with the previously mentioned peripheral marginal latching recesses 80.

The latching means for cooperation with the latching recesses 80 may comprise a second leaf spring 100 which, as best shown in Fig. 12, is attached to the face wall 36 of the housing by a suitable screw 101 in position to extend across a radial recess 102 in the face wall. The leaf spring 100 carries on its forward face a suitable latching lug 104 which normally engages one of the peripheral marginal latching recesses 80 of the inner scale member 28. The outer end of the leaf spring carries an operating button 105 which extends outward through a corresponding aperture 106 in the face wall 36. Depressing the button 105 flexes the leaf spring 100 to carry the latching lug 104 into the housing recess 102 to give the inner scale member 28 freedom for rotation relative to the housing.

The manner in which this first embodiment of the invention may be operated to serve its purpose may be readily understood from the foregoing description.

In a typical sequence of steps, the latch button 95 is first depressed to release the two rotary scale members 26 and 28 from each other and then the button 86 that is fixedly mounted on the face of the outer scale member 26 is used to rotate the outer scale member to position the window 87 of the outer scale member at the number on the scale 81 of the inner scale member that corresponds to the sensitivity of the film in the camera. During this rotational adjustment of the outer rotary scale member 26 relative to the inner rotary scale member 28, the inner rotary scale member is held immobilized by the latching lug 104 in engagement with one of the peripheral marginal latching recesses 80. At the end of the rotational movement of the outer rotary scale member 26 to the appropriate numeral on the underlying scale 81 the latch button 95 is released to cause the latching lug 94 to engage the corresponding latching recess 85 to interlock the two rotary scale members, there being one latching recess 85 for each numeral on the scale 81.

The outer latch button 105 is then depressed to disengage the latching lug 104 from the inner rotary scale member 28 to permit both of the scale members to be rotated in unison while interlocked by the latching lug 94. The two scale members may be rotated in unison either by means of the button 87 on the outer scale member 26 or by the latch button 95, care being taken not to depress the latch button 95. The two scale members 26 and 28 are rotated in this manner to bring the appropriate value on the shutter time scale 88 into register with the index 90 in accord with the selected shutter time setting of the camera. When the scale 88 is positioned in this manner relative to the index mark 90 the depressed latch button 105 is released to cause the latching lug 104 to engage the corresponding peripheral marginal latching recess 80 of the inner rotary scale member 28, there being one latching recess 80 for each significant position on the shutter time scale 88.

The presetting of scale members 26 and 28 in the manner described above and in accordance with the proper values of film sensitivity and camera shutter time produces a corresponding rotation of cam member 30 and hence a corresponding adjustment of light valve leaves 45. Thus, the light valve is adjusted so as to properly control the admission of light to the photoelectric cell 23, thereby presetting the meter to have a sensitivity corresponding to that of the camera as established by the above factors S and $t$.

The exposure meter is now used to measure incident illumination at the location of the photographic subject, and at this location is oriented with the depth axis of the light collector dome 20 pointed towards the location of the camera. With the exposure meter held in this position the answer to the exposure problem in terms of the aperture setting of the camera may be read directly from the position of the pointer 33 on the camera aperture scale 35.

A feature of the preferred practice of the invention is the use of the colors red, white and blue for guidance in the sequence of the steps for solving an exposure problem, this sequence of colors being natural for citizens of the United States. To carry out this sequence, red numerals are employed for the film index scale 81 to indicate that the first step of adjustment should be directed to this scale. Preferably the latch button 95 is also colored red since this button is depressed for the purpose of carrying out this first step. To designate the second step in the preferred procedure the numerals of the shutter time scale 88 on the outer rotary scale member 26 are white numerals and, preferably, the latch button 105 that must be depressed for the purpose of carrying out this second step is a white button. Since the third step is to read the answer in terms of the correct $f$-stop for the camera lens, the scale 35 along which the pointer 33 moves has blue numerals on a background of suitable contrast. If desired the backgrounds for the various scales may be distinguished by these three colors instead of the numerals of the scale.

The semiellipsoidal light collector dome 20 has an illumination acceptance angle substantially greater than $2\pi$ steradians but less than $4\pi$ steradians and therefore can effectively represent the camera side of a photographic subject. This semiellipsoidal configuration of the light collector is particularly effective since it closely represents the shape of the most popular photographic subject, the human face. When properly positioned at the subject's position, the distribution of illumination over the surface of the light collector will be similar to the distribution of illumination over a human face to result in exceptional accuracy in the evaluation of the photographic value of the incident illumination.

The departure from a true circle of the configuration of the light collector 20 as viewed in plan is further desirable because the most efficient configuration for the variable opening of the light valve 25 is rectangular. Thus the ellipsoidal base of the light collector fits relatively closely around the rectangular aperture of the light valve and also permits the leaves of the light valve to open upward into the hollow interior of the light collector. It is important to note that the light-admitting slot 46 formed by the two leaves 45 of the light valve is not only positioned on one of the base axes of the light collector, in this instance on the minor axis, but is also in the region of the radial center of the light collector as the light collector is viewed in section in Fig. 6.

There is, of course, no definite center of curvature, i. e., no one center of curvature for the section of the light collector shown in Fig. 6 but, nevertheless, a major portion of the light that is transmitted inward through the wall of the collector is directed inwardly into the region of the symmetrical center of the cross section of the light collector. The light valve slot 46 shifts both inwardly and outwardly from this symmetrical center at the base of the light collector but, nevertheless, remains in this region.

It will be noted that at the positions of the light valve leaves 45 that narrow the slot 46 to reduce the admission of light to a minimum, the slot is very close to the symmetrical center, being slightly inward from the base plane of the light collector, and this range of positions of minimum width of the slot 46 favors the admission of light to the slot from a maximum range of angles. Thus the light that passes through the slot approaches the slot from a wide range of angles and correspondingly diverges inside the slot over the same wide range of angles. Thus the light inside the light valve diverges to spread over the entire surface of the photoelectric cell 22 and thereby minimizes any error that might otherwise arise from variations in sensitivity over the area of the photoelectric cell.

A light valve for use in a small portable hand-held exposure meter is inherently limited to a useful variable transmission range of approximately 100 to 1. This limitation arises in part from such factors as backlash in the actuating mechanism of the light valve and arises in greater part from the scale spacing at or near the closed position of the light valve. Usually a linear spacing of logarithmic values of light intensity is desired on an operating scale and usually a cam and follower mechanism is employed, as exemplified by the present embodiment of the invention. In such an arrangement the cam surface necessarily approaches flatness in the region used at the nearly closed positions of the valve.

An important feature of the present invention is the manner in which this limited range of 100 to 1 is, in effect, extended. For appreciation of this aspect of the invention it is to be borne in mind that illumination values commonly encountered in photographic practice range from 8 foot-candles to 8,000 foot-candles, thus extending over a range of 1,000 to 1. Furthermore, in the case of exposure meters measuring reflected light, the light reflected from the photographic subject may be as low as 2% of the incident light or as high as 80% thus extending over a range of 40 to 1. The product of these two ranges of illumination and reflectance is a brightness scale extending over a range of 40,000 to 1 which is 400 times the available practical light valve range of about 100 to 1.

One provision in the present exposure meter to meet the above mentioned inherent limitation is the provision for measuring only incident light, thus bringing the range of exterior values down to 1,000 to 1. A second provision to the same end is the use of a complete aperture scale 35 for the electrical indicator pointer 33, ranging from aperture setting f-1.4 to aperture setting f-22 thus encompassing a range of values of light intensity of 256 to 1. This combination of a light valve with a range of 100 to 1 and an electrical indicator having a range encompassing values of light intensity of 256 to 1 results in a combined range of 25,600 to 1, which greatly exceeds the required range of 1,000 to 1. The excess range is used to provide exceptional flexibility in the operation of the exposure meter.

A third provision which is helpful in the same direction in this first embodiment of the invention is the use of two coacting movable controls to govern the adjustment of the light valve. As heretofore explained, one of the two rotary scale members has a peripheral scale calibrated in terms of camera shutter time and the other rotary scale member has a peripheral scale calibrated in terms of film sensitivity. Thus the adjustment of the light valve in the solving of an exposure problem is the result of the combined settings of the two rotary scale members.

In the normal course of photographic practice it is customary to use a film having a high sensitivity in all instances where very short shutter times are required, as for example in photographing sports events. It is also usual to employ relatively long shutter times when a film of low sensitivity is being exposed. The inter-acting effect, under these normal circumstances, of the two separately scaled rotary controls is such as to decrease the requirement for extended range of variable transmission of light through the valve. This fact may be appreciated when it is considered that all of the following list of couples of film index and shutter time may be used selectively without requiring movement of the light valve:

| Film index: | Shutter time |
|---|---|
| ASA 5 | second 1/5 |
| ASA 10 | do 1/10 |
| ASA 25 | do 1/25 |
| ASA 50 | do 1/50 |
| ASA 100 | do 1/100 |
| ASA 200 | do 1/200 |
| ASA 400 | do 1/400 |

It will be noted in this list of couples that in shifting from one couple to another the setting of one of the rotary scale members for the film index value exactly offsets the setting of the other rotary scale member for the shutter time value.

The second embodiment of the invention shown in Figs. 13 to 15 is of the same general character as the first embodiment of the invention and in the same manner includes a light collector dome 20 on a housing 111 that is of the same general configuration as the previously described housing 22. This second embodiment of the invention has the same light valve mechanism actuated by the same rotary cam element 30 and has the same combination of a photoelectric cell and microammeter with the pointer of the microammeter traversing a scale of camera aperture settings.

In the second embodiment of the invention the housing 111 has a face wall 112 which serves as a fixed scale member, as in the first embodiment of the invention, but in this instance the fixed scale member is provided with a circular scale 115 of ASA film index numerals. Only one rotary scale member is employed, namely a rotary scale member 116 that carries a peripheral scale 117 of shutter time settings to be used in cooperation with the circular scale 115.

The rotary scale member 116 is keyed to or otherwise united with a hub member 118 for rotation therewith and the inner end of the hub member 118 is, in turn, united with the previously mentioned rotary cam member 30 so that rotation of the rotary scale member 116 results in varying the adjustment of the light valve.

Preferably a suitable latch means is provided to immobilize the rotary scale member 116 at its various positions selectively. For this purpose a U-shaped leaf spring 120 may be mounted in a recess 121 in the face wall 112 as shown in Fig. 15. The outer leg of the leaf spring 120 carries a latching lug 122. The housing wall has an inner recess 123 and the inner periphery of the rotary scale member 116 has a series of inner peripheral recesses 124 which may be registered with the recess 123 to receive the latching lug 122. Thus the latching lug 122 in entering the recess 123 of the housing together with a selected recess 124 of the rotary scale member 116 interlocks the scale member and the housing. A suitable operating button 125 on the end of the leaf spring extends through an aperture 126 in the face wall 112. Depressing the button 126 releases the rotary scale member 116 for rotation. The rotary scale member 116 may be provided with a button 127 fixed thereto on its forward face to serve as a handle or finger piece for manual rotation of the scale member.

It is apparent that this second embodiment of the invention requires merely the setting of the rotary scale member 116 in accord with the film index and the camera shutter speed setting. The second embodiment of the invention is mechanically simpler than the first embodiment but the first embodiment of the invention has the advantage of making it unnecessary to keep the film speed in mind when presetting the scales for different shutter time values for the solution of different exposure problems.

In this second embodiment, the colors red, white and blue are also preferably used to indicate the sequence in which different factors are considered in solving an exposure problem. Thus, red numerals may be employed for the film sensitivity scale 115, since the film sensitivity will remain the same as long as a given film is in the camera and should therefore be considered first. The next factor to be considered is the shutter time, and white numerals may therefore be employed for the shutter time scale 117. As in the first embodiment, the numerals of the camera aperture scale associated with the microammeter pointer may be colored blue, to indicate that the last step is to read the correct f-stop value on this scale. As before, this sequence may be indicated by using these three colors for the backgrounds of the respective scales instead of the numerals themselves.

My description in specific detail of selected embodiments of the invention will suggest to those skilled in the art various changes, substitutions and other departures from my disclosure that may be made within the spirit and scope of the appended claims.

I claim:

1. In an exposure meter, the combination of: a housing having two relatively broad opposite side faces and having a light-receiving window at one end, said housing being relatively thin in a minor cross sectional dimension extending perpendicular to said broad side faces and to the length of said housing; a photo-sensitive element positioned in said housing to receive light from said window; an adjustable light valve in said housing to vary the amount of light admitted through said window; indicating means within said housing responsive to said photosensitive element said indicating means including a scale of camera aperture settings visible on one of said side faces of the housing and an indicating element movable relative thereto in a plane perpendicular to said minor cross sectional dimension; a plurality of scale members on the other side face of said housing rotatable relative to the housing in planes perpendicular to said minor cross sectional dimension, including a first rotary scale member adjustable relative to the housing in accord with one of the two factors, camera shutter time and film speed rating, and a second rotary scale member adjustable relative to the first scale member in accord with the other of said two factors; means operatively connecting said second rotary member with said light valve for adjustment thereof to vary the amount of light admitted through said window; said housing having at least one fixed indicium thereon; and means to releasably latch said two rotary scale members together to rotate in unison for adjustment relative to said indicium.

2. A combination as set forth in claim 1 which includes means to releasably latch one of said two rotary scale members against rotation relative to said housing.

3. A combination as set forth in claim 2 in which parts of the exposure meter are colored red, white and blue to indicate a preferred sequence of three steps in the use of the exposure meter.

4. In an exposure meter for determining camera adjustments on the basis of factors including the effective illumination of the subject as one factor, the sensitivity of the film as a second factor, the camera shutter time adjustment as a third factor and the camera aperture adjustment as a fourth factor, the combination of: a housing of pocket-fitting configuration, said housing being relatively broad along one cross sectional dimension and relatively narrow along a second cross sectional dimension perpendicular thereto; a hollow translucent light collector dome on one end of said housing, said dome being of a generally semiellipsoidal configuration having a major base axis, a minor base axis and a depth axis, all perpendicular to each other, said major base axis extending in the direction of said first mentioned cross sectional dimension of the housing and said depth axis extending longitudinally of the housing; a photo-sensitive element positioned in said housing to receive light from said dome; a variable light valve between said dome and said photo-sensitive element to vary the amount of light reaching the element; a scale on one side of the housing representing said fourth factor and extending in a plane perpendicular to said second cross sectional dimension of the housing; indicating means in said housing including an indicating element movable relative to said scale in a plane parallel to said scale in response to said photosensitive element; scale means on the opposite side of the housing for adjustment in accordance with said second and third factors, said scale means including at least one movable scale member rotatable relative to said housing in a plane perpendicular to said second cross sectional dimension of the housing; and means operatively connecting said movable scale member with said light valve for adjustment thereof in accord with said second and third factors.

5. A combination as set forth in claim 4 in which said minor base axis is between three-fifths and three-fourths of the length of said major base axis.

6. A combination as set forth in claim 4 in which said minor base axis is of approximately two-thirds of the length of said major base axis.

7. A combination as set forth in claim 4 in which the length of said depth axis is between one-half of the length of said major base axis and one-half the length of said minor base axis.

8. A combination as set forth in claim 4 in which the length of said depth axis is approximately one-fourth of the combined length of said major and minor axes.

References Cited in the file of this patent

UNITED STATES PATENTS

| 1,931,283 | Brewer | Oct. 17, 1933 |
| 1,990,361 | Bailey | Feb. 5, 1935 |
| 2,178,197 | Bing | Oct. 31, 1939 |
| 2,337,122 | Norwood | Dec. 21, 1943 |
| 2,481,678 | Mihaly | Sept. 13, 1949 |
| 2,584,440 | Fogle | Feb. 5, 1952 |
| 2,667,809 | Williams | Feb. 2, 1954 |
| 2,700,916 | Muirhead | Feb. 1, 1955 |

FOREIGN PATENTS

| 884,531 | France | Apr. 27, 1943 |